Figure 6:
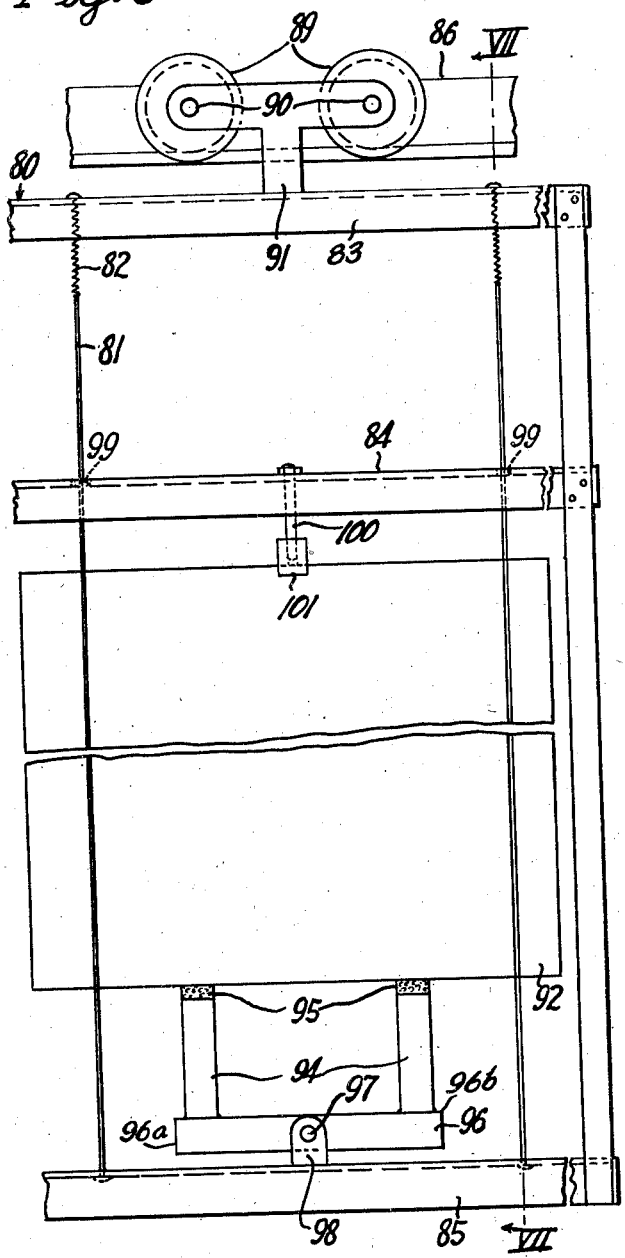

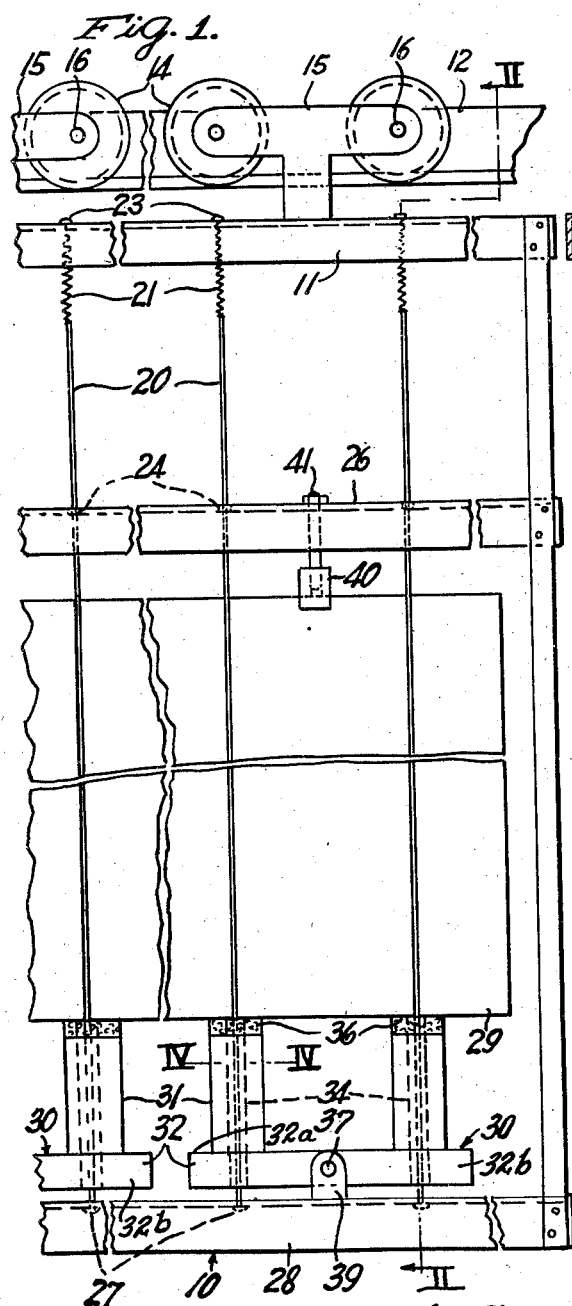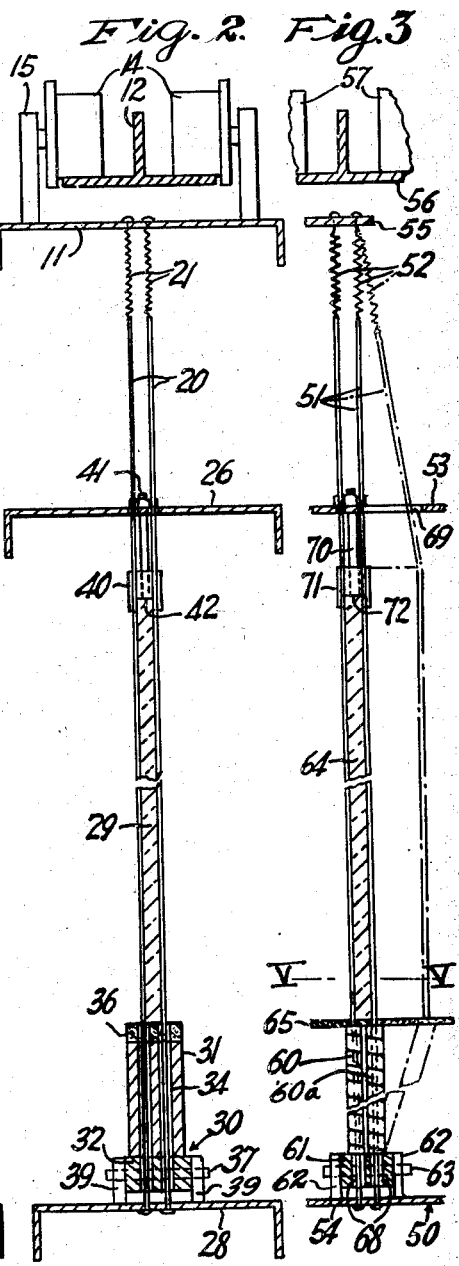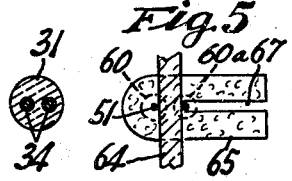

July 1, 1947. G. Z. MINTON ET AL 2,423,249
GLASS SUPPORTING CARRIAGE
Filed Dec. 27, 1943 2 Sheets-Sheet 2

Inventors
GERALD Z. MINTON and
LLOYD V. BLACK
By Olen E. Bee
Attorney

Patented July 1, 1947

2,423,249

UNITED STATES PATENT OFFICE 2,423,249

GLASS SUPPORTING CARRIAGE

Gerald Z. Minton and Lloyd V. Black, Tarentum, Pa., assignors to Pittsburgh Plate Glass Company, a corporation of Pennsylvania Application December 27, 1943, Serial No. 515,710

6 Claims. (Cl. 49—45)

This invention relates to supporting frames for glass sheets and it has particular relation to travelling frames for holding sheet glass in an upright position in connection with heat treatment thereof.

One object of the invention is to provide an improved arrangement of supporting elements adapted to hold the sheet glass in an upright position upon its lower edge while preventing the glass from sagging when it is subjected to heat treatment.

Another object of the invention is to provide an improved arrangement of supports for holding sheet glass in an upright position in which it can rest upon its lower edge and can be subjected to bending or other treatment while so held.

In the type of glass supporting frame structure in which flexible members, such as wires are employed, it has been customary to suspend the glass by means of tongs, which grip the upper edge portions of the glass. Sheet glass supported in this manner during a heating process is marked by unsightly dents impressed by the tongs. In a practical application of this invention the glass is so supported that the use of tongs or other gripping members is obviated by supporting the glass between wires which are arranged in pairs and cooperate with suitable supporting members which support the edge of the glass in such manner that its weight is evenly distributed while the glass can be heated in a predetermined upright position.

Certain of the wires can be manipulated to facilitate glass bending operations which may be performed by the action of the wires upon the glass. Likewise the supporting structure which is movable into and out of a conventional type of furnace employed in heating glass, is adapted to accommodate glass, which is to be annealed, or otherwise subjected to any treatment which may be desired incidentally to the heating thereof.

Figure 7:
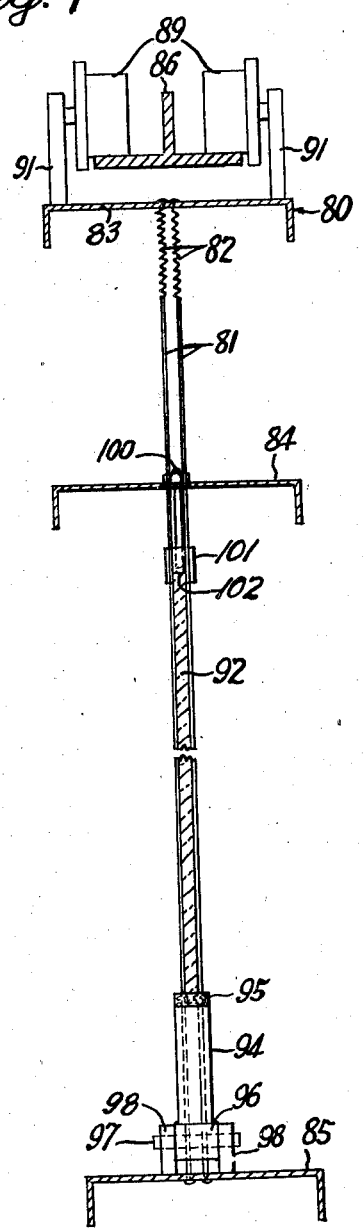
Figure 8:
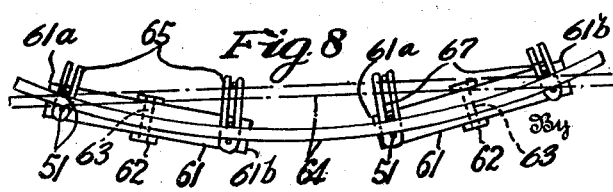

In the drawing:

Fig. 1 is a fragmentary side elevation of a glass supporting carriage; Fig. 2 is a fragmentary vertical section taken substantially along the line II—II of Fig. 1; Fig. 3 is a fragmentary vertical section similar to Fig. 2 of another form of carriage structure; Fig. 4 is a horizontal section taken substantially along the line IV—IV of Fig. 1; Fig. 5 is a fragmentary horizontal section taken substantially along the line V—V of Fig. 3; Fig. 6 is a fragmentary side elevation similar to Fig. 1 of another form of supporting structure; Fig. 7 is a vertical section taken substantially along the line VII—VII of Fig. 6; and Fig. 8 is a diagrammatic plan illustrating the position of glass and supporting elements of the type shown in Fig. 3.

In practicing the invention a carriage 10 in the form of a frame, including an upper portion 11, is mounted for horizontal movement upon an overhead rail track 12, upon which rollers 14 are supported to sustain the carriage in a vertical position. Brackets 15, mounted by welding or otherwise upon the upper portion 11 of the carriage, support horizontal stud shafts 16 upon which the rollers are rotatably mounted. Carriages of this type are designed to travel into and out of a furnace of the type shown in U. S. patent to Whitmire et al., No. 2,288,507.

Pairs of vertical parallel wires 20 at their upper ends are connected to tension springs 21, which are mounted as indicated at 23 in the upper portion of the frame 10. These springs 21 in effect constitute resilient sections of the wires and render them movable for appreciable lateral displacement. The wires extend downwardly through openings 24 in an intermediate horizontal frame portion 26 of the carriage and at their lower ends are secured, as indicated at 27, to a lower horizontal frame portion 28 of the carriage. The wires of each pair are tensioned and sufficiently spaced to receive between them a sheet of glass 29 which is held on edge in a vertical position upon cradles 30. Two or more pairs of wires are employed for holding the glass in an upright position upon the cradles. Each cradle includes two upright tubular supports 31 mounted either rigidly or merely resting upon a horizontal beam 32 that has opposite end portions 32a and 32b. Vertical openings 34 extending through the tubular supports and beams loosely receive the wires 20 and the upper surface of each tubular support carries a pad or plate of incombustible material 36, such as asbestos, or heat resisting alloy, upon which the bottom edge of the glass rests.

A central portion of the beam 30 has a pivotal connection 37 securing it upon an upright support 39 that can be in the form of a bracket and is rigidly mounted upon the lower frame portion 28. The tubular supports 31 therefore carry the weight of the glass evenly distributed thereon.

If desired a sleeve 40 can be slidably mounted upon a vertical bolt 41 carried by the intermediate frame portion 26. The upper edge of the glass 29 fits into a notch or groove 42 formed in the lower portion of the sleeve for the purpose of steadying the glass in its vertical position. In this position of the glass in the carriage frame, the latter can be moved into and out of a furnace to heat the glass for bending, or whatever other treatment that may be desired after the heat treatment.

Referring to Figs. 3, 5 and 8, a frame carriage 50 is provided with vertically tensioned wires 51 having upper spring sections 52 and arranged with reference to frame portions 53, 54 and 55 of the carriage similarly to the corresponding portions 26, 28 and 11, respectively, in the structure already described. The carriage 50 is mounted upon an overhead track 56 by means of rollers 57 arranged in the same manner as the rollers 14 and in the same relation to the carriage.

According to these figures there are included tubular supports 60 and 60a which are composed of flexible strands or strips of metal helically coiled and through which the wires 51 are disposed. A wire passes through each tubular support. The lower ends of the flexible helical supports rest upon opposite end portions 61a and 61b of beams 61 which teeter upon upright supports 62 pivotally supporting them intermediately upon horizontal pins 63. The upright supports 62, which carry the pins 63, are carried rigidly upon the lower frame portion 54.

Sheet glass 64 rests upon incombustible plates 65 composed of asbestos, or heat-resisting alloy, through which the wires extend. One wire of each pair is disposed in a slotted portion 67 (Fig. 5) of each plate which permits the wire to be sprung to one side. The wires pass vertically through openings 68 formed in the beams 61. Lateral movement of one of the wires of each pair is further facilitated by slotting the intermediate frame portion 53, as indicated at 69. The sheet glass 64 can be in bent form and supported by an arrangement of this kind and the pairs of wires for such an arrangement are disposed along a predetermined curve, as indicated in Fig. 8. If it is desired to bend flat sheet glass it is positioned as indicated in broken lines of Figs. 3 and 8, and one wire of each of certain of the pairs can be sprung out from the location of the predetermined curve to press against the flat sheet glass tending to bend it. After heating the glass to softening temperature as described in our U. S. Patent 2,239,546, the pressure exerted by the wires bends the glass to the full line position. The flexible character of the tubular supports 60 permits the positioning of the wires and glass as described while still providing adequate support for such glass along its lower edge.

If desired a bolt 70 is provided for slidably supporting a sleeve 71 thereon. This bolt is mounted in the same manner as the bolt 41 in the intermediate frame portion 53. The lower portion of the sleeve has a notch or groove 72 therein to receive the upper edge of the glass and assist in steadying it. If this sleeve is employed in bending glass it is positioned at a portion of the glass that is subjected to very little or no lateral movement.

In Figs. 6 and 7 a frame carriage 80 is provided with vertically tensioned wires 81 having upper spring sections 82 arranged with reference to frame portions 83, 84 and 85 of the carriage similarly to the corresponding portions 11, 26 and 28, respectively, shown in Figs. 1 and 2. The carriage is mounted upon an overhead track 86 by means of rollers 89 rotatably on stud shafts 90 carried horizontally in brackets 91 that are rigidly secured to the carriage.

According to these figures sheet glass 92 is supported upon the upper ends of upright supports 94 that are provided with incombustible pads or plates 95 of asbestos, or the like, to cushion the glass supported thereon. These supports are rigidly mounted upon opposite end portions 96a and 96b of a horizontal balancing beam 96 that has an intermediate pivotal connection 97 securing it to an upright support 98 that is rigidly carried upon the lower frame portion 85. It is to be noted that the wires 81 do not pass through the supports 94 or beam 96, but do pass through openings 99 in the frame portion 84. A bolt 100 slidably supporting a sleeve 101 is mounted in the intermediate frame portion 84 and the lower side of the sleeve has a notch or groove 102 to receive the upper edge of the sheet glass to assist in steadying the latter.

In the arrangements of the type described above the sheet glass is so supported as to prevent sagging or displacement while being subjected to heat in a furnace. Such structures are useful in heating glass sheets for various purposes and the wires can be positioned adjacent the extremities of the glass to provide maximum area upon which there is no probability of the appearance of strain or other marks which otherwise might appear as a result of the proximity of the glass to the wires in connection with the heating process.

Although only illustrative forms of the invention have been shown and described in detail, it will be apparent to those skilled in the art that the invention is not so limited, but that various changes can be made therein without departing from the spirit of the invention or from the scope of the appended claims.

We claim:

1. In a device for supporting sheet glass, a frame including spaced upper and lower frame members, pairs of wires suspended from the upper to the lower frame members, the wires of each pair being parallel for embracing the sheet glass on its opposite sides, a support stationary on the lower frame member and spaced from the wires, and a bar having an intermediate pivotal connection securing it on said support, said bar having upright supports on opposite sides of said pivotal connection for supporting the sheet glass along its lower edge between the wires of said pairs.

2. A frame for supporting sheet glass, said frame including upper and lower portions, pairs of wires suspended from the upper to the lower portions of the frame, the wires of each pair being parallel for embracing the glass on its opposite sides, and flexible tubular supports receiving the wires therethrough and being supported by the lower portion of the frame for receiving the sheet glass along the edge of the latter to hold it in an upright position between the wires.

3. In an apparatus for supporting sheet glass, a frame carriage including upper and lower portions and adapted to travel upon a track, pairs of wires suspended under tension between the upper and lower portions of the frame, the wires of each pair being parallel for embracing sheet glass on its opposite sides, and a beam having an intermediate pivotal connection supporting it on the lower portion of the frame and having wire receiving recesses in its opposite end portions, opposite end portions of the beam having upwardly projecting supports thereon for receiving the lower edge of the sheet glass and supporting the latter in an upright position between the wires, said wires being disposed in the recesses in the end portions of the beam and serving to guide the sheet glass in mounting the latter upon the supports.

4. In an apparatus for supporting sheet glass, a frame carriage including upper and lower portions and adapted to travel upon a track, pairs of wires suspended under tension between the upper and lower portions of the frame, the wires of each pair being parallel for embracing the glass on its opposite sides, a beam pivotally mounted substantially horizontally in the lower portion of the frame, and upwardly projecting supports mounted upon opposite end portions of the beam for receiving the lower edge of the glass and supporting the latter in an upright position between the wires, said supports having openings through which the wires extend.

5. In an apparatus for supporting sheet glass, a frame carriage including upper and lower portions and adapted to travel upon a track, pairs of wires suspended under tension between the upper and lower portions of the frame, the wires of each pair being parallel for embracing the glass on its opposite sides, a beam pivotally mounted substantially horizontally in the lower portion of the frame, and upwardly projecting supports mounted upon opposite end portions of the beam for receiving the lower edge of the glass and supporting the latter in an upright position between the wires, each support including a flexible helical metal member in tube form, each helical metal member in tube form having one of the wires disposed therethrough.

6. In an apparatus for supporting sheet glass, a frame carriage including upper and lower portions and adapted to travel upon a track, pairs of wires suspended yieldably under tension between the upper and lower portions of the frame, the wires of each pair being parallel for embracing sheet glass on opposite sides thereof, flexible tubular members receiving the wires therethrough and supported by the lower portion of the frame for supporting the sheet glass along the edge thereof while it is disposed between the wires, and plates receiving the wires therethrough and resting upon the upper ends of the flexible tubular members, each of said plates having a slotted portion to permit one wire of a pair to be displaced laterally from the other wire.

GERALD Z. MINTON.
LLOYD V. BLACK.

REFERENCES CITED

The following references are of record in the file of this patent:

UNITED STATES PATENTS

| Number | Name | Date |
|---|---|---|
| 2,288,507 | Whitmire et al. | June 30, 1942 |
| 2,297,246 | Quentin | Sept. 29, 1942 |

FOREIGN PATENTS

| Number | Country | Date |
|---|---|---|
| 506,787 | Great Britain | May 26, 1939 |